(12) United States Patent
Liu et al.

(10) Patent No.: US 10,203,734 B2
(45) Date of Patent: Feb. 12, 2019

(54) TEMPERATURE MONITORING SYSTEM AND TEMPERATURE MONITORING METHOD

(71) Applicants: Inventec (Pudong) Technology Corporation, Shanghai (CN); INVENTEC CORPORATION, Taipei (TW)

(72) Inventors: Jian-Fei Liu, Shanghai (CN); Guo-Xin Sun, Shanghai (CN)

(73) Assignees: Inventec (Pudong) Technology Corporation, Shanghai (CN); INVENTEC CORPORATION, Taipei (TW)

(*) Notice: Subject to any disclaimer, the term of this patent is extended or adjusted under 35 U.S.C. 154(b) by 189 days.

(21) Appl. No.: 15/355,074

(22) Filed: Nov. 18, 2016

(65) Prior Publication Data
US 2018/0067527 A1 Mar. 8, 2018

(30) Foreign Application Priority Data
Sep. 5, 2016 (CN) .......................... 2016 1 0802692

(51) Int. Cl.
*G06F 11/00* (2006.01)
*G06F 1/20* (2006.01)
(Continued)

(52) U.S. Cl.
CPC ............ *G06F 1/206* (2013.01); *G06F 1/3206* (2013.01); *G06F 1/3246* (2013.01); *G06F 9/442* (2013.01);
(Continued)

(58) Field of Classification Search
CPC ...... G06F 1/206; G06F 1/3206; G06F 1/3246; G06F 9/442; G06F 11/0721; G06F 11/0793; G06F 11/3206; G06F 11/3246
See application file for complete search history.

(56) References Cited

U.S. PATENT DOCUMENTS

| 2003/0135767 | A1* | 7/2003 | Chu ........................ G06F 1/206 |
| | | | 713/300 |
| 2010/0064128 | A1* | 3/2010 | Mendelow .......... G06F 11/1441 |
| | | | 713/100 |

(Continued)

FOREIGN PATENT DOCUMENTS

| TW | 200708918 A | 3/2007 |
| TW | 201019103 A | 5/2010 |

*Primary Examiner* — Jason B Bryan
(74) *Attorney, Agent, or Firm* — CKC & Partners Co., Ltd.

(57) ABSTRACT

A temperature monitoring system includes a temperature sensing device, a management controlling device and a logic device. The temperature sensing device monitors temperature of a central processing unit of a computer system, and sets a first temperature threshold and a second temperature threshold. The management controlling device determines whether the temperature is higher than the first temperature threshold, and further determines whether the temperature is higher than the second temperature threshold when the temperature is higher than the first temperature threshold. The logic device controls the computer system to turn on or shut down. When the temperature is higher than the second temperature threshold, the management controlling device controls the logic device to execute a forced shutdown of the computer system, locks a power button of the computer system and stores an event log.

8 Claims, 3 Drawing Sheets

(51) Int. Cl.
*G06F 9/4401* (2018.01)
*G06F 11/07* (2006.01)
(52) U.S. Cl.
CPC ...... *G06F 11/0721* (2013.01); *G06F 11/0793* (2013.01)

(56) References Cited

U.S. PATENT DOCUMENTS

| | | | |
|---|---|---|---|
| 2010/0117579 A1* | 5/2010 | Culbert | G06F 1/20 318/471 |
| 2013/0173082 A1 | 7/2013 | Pippin | |
| 2014/0028377 A1 | 1/2014 | Rosik | |
| 2015/0032784 A1* | 1/2015 | Hu | G06F 17/30194 707/827 |

* cited by examiner

TEMPERATURE MONITORING SYSTEM AND TEMPERATURE MONITORING METHOD

RELATED APPLICATIONS

This application claims priority to Chinese Application Serial Number 201610802692.0, filed Sep. 5, 2016, which is herein incorporated by reference.

BACKGROUND

Technical Field

The present invention relates to a temperature monitoring technology. More particularly, the present invention relates to a temperature monitoring system and a temperature monitoring method.

Description of Related Art

In a computer system, some processors (e.g., advanced RISC (Reduced instruction set computing) machine, ARM) processor) cannot implement a related protection mechanism when the temperature of the processor is too high, and therefore the computer system may be damaged.

SUMMARY

An aspect of the present disclosure is a temperature monitoring system. The temperature monitoring system includes a temperature sensing device, a management controlling device and a logic device. The management controlling device is coupled to the temperature sensing device, and the logic device is coupled to the management controlling device. The temperature sensing device is configured to monitor a temperature of a central processing unit of a computer system, and set a first temperature threshold and a second temperature threshold. The management controlling device is configured to determine whether the temperature is higher than the first temperature threshold, and further determined whether the temperature is higher than the second temperature threshold when the temperature is higher than the first temperature threshold. The second temperature threshold is higher than the first temperature threshold. The logic device is configured to control the computer system to turn on or shut down. When the temperature is higher than the second temperature threshold, the management controlling device controls the logic device to execute a forced shutdown of the computer system, locks a power button of the computer system, and stores an event log.

Another aspect of the present disclosure is a temperature monitoring method. The temperature monitoring method includes steps as follows. A temperature of a central processing unit of a computer system is monitored, and a first temperature threshold and a second temperature threshold are set by a temperature sensing device. A determination is made whether the temperature is higher than the first temperature threshold by a management controlling device. When the temperature is higher than the first temperature threshold. A determination is further made whether the temperature is higher than the second temperature threshold by the management controlling device. The second temperature threshold is higher than the first temperature threshold. When the temperature is higher than the second temperature threshold. A logic device is controlled to execute a forced shutdown of the computer system, a power button of the computer system is locked, and an event log is stored by the management controlling device.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

In order to make the description of the disclosure more detailed and comprehensive, reference will now be made in detail to the accompanying drawings and the following embodiments. However, the provided embodiments are not used to limit the ranges covered by the present disclosure; orders of step description are not used to limit the execution sequence either. Any devices with equivalent effect through rearrangement are also covered by the present disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise indicated, all numbers expressing quantities, conditions, and the like in the instant disclosure and claims are to be understood as modified in all instances by the term "about." The term "about" refers, for example, to numerical values covering a range of plus or minus 20% of the numerical value. The term "about" preferably refers to numerical values covering range of plus or minus 10% (or most preferably, 5%) of the numerical value. The modifier "about" used in combination with a quantity is inclusive of the stated value.

In this document, the term "coupled" may also be termed as "electrically coupled", and the term "connected" may be termed as "electrically connected". "coupled" and "connected" may also be used to indicate that two or more elements cooperate or interact with each other.

Figure 1:
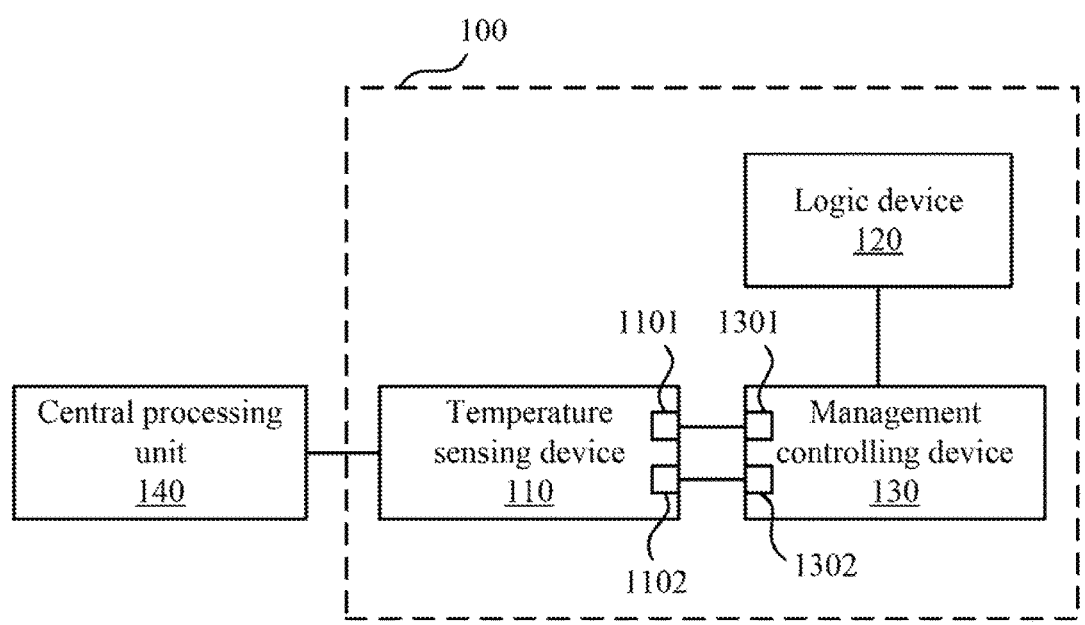
FIG. 1 is a schematic diagram of a temperature monitoring system according to an embodiment of the present disclosure.
Figure 2:
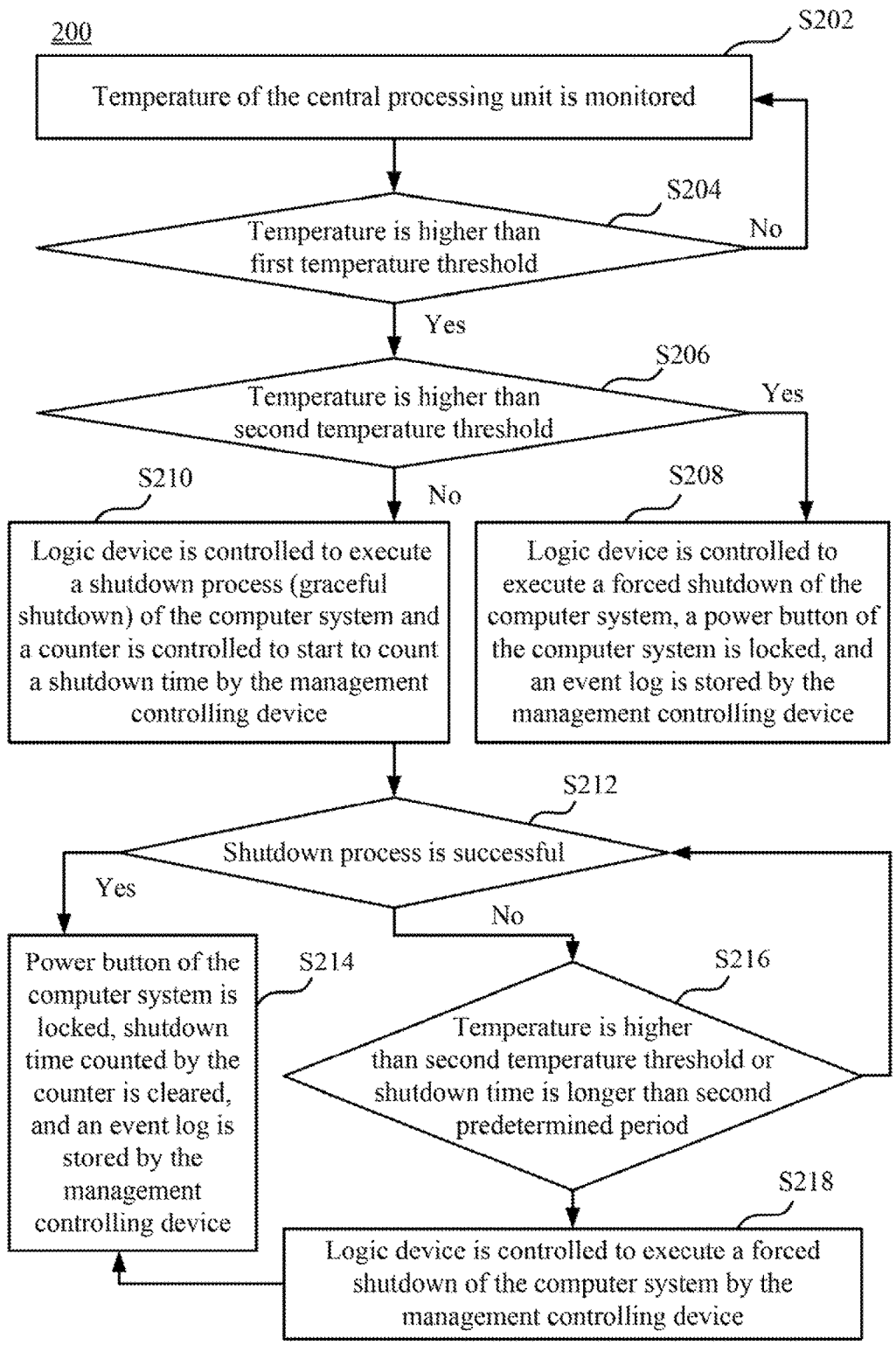
FIG. 2 is a flow chart of a temperature monitoring method according to an embodiment of the present disclosure.

Reference is made to FIGS. 1 and 2. FIG. 1 is a schematic diagram of a temperature monitoring system 100 according to an embodiment of the present disclosure. FIG. 2 is a flow chart of a temperature monitoring method 200 according to an embodiment of the present disclosure. The temperature monitoring method 200 includes steps S202-S218, and the temperature monitoring method 200 can be applied to the temperature monitoring system 100 as shown in FIG. 1.

However, those skilled in the art should understand that the mentioned steps in the present embodiment are in an adjustable execution sequence according to the actual demands except for the steps in a specially described sequence, and even the steps or parts of the steps can be executed simultaneously.

The temperature monitoring system 100 includes a temperature sensing device 110, a management controlling device 130 and a logic device 120. The management controlling device 130 is coupled to the temperature sensing device 110, and the logic device 120 is coupled to the management controlling device 130.

In operation, the logic device 120 is configured to control a computer system to turn on or shut down. In step S202, the temperature sensing device 110 is configured to monitor a temperature T of a central processing unit 140 of the computer system, and set a first temperature threshold T1 (e.g., about 91° C., however, the present disclosure is not limited thereto) and a second temperature threshold T2 (e.g., about 100° C., however, the present disclosure is not limited thereto). In step S204, the management controlling device 130 is configured to determine whether the temperature T of the central processing unit 140 is higher than the first temperature threshold T1. When the temperature T is higher than the first temperature threshold T1, it indicates that the temperature T of the central processing unit 140 exceeds a safe operating temperature. Then, in step S206, the management controlling device 130 further determines whether the temperature T is higher than the second temperature threshold T2. When the temperature T is higher than the second temperature threshold T2, the management controlling device 130 controls the logic device 120 to execute a forced shutdown of the computer system, locks a power button of the computer system, and stores an event log (e.g., a log file) in step S208.

Specifically, a pin 1101 of the temperature sensing device 110 is coupled to a pin 1301 (e.g., a general purpose input/output (GPIO) pin) of the management controlling device 130, and a pin 1102 of the temperature sensing device 110 is coupled to a pin 1302 (e.g., a GPIO pin) of the management controlling device 130. The temperature sensing device 110 is further configured to pull the pin 1101 to a first level e.g., a logic low level) when detecting that the temperature T of the central processing unit 140 is higher than the first temperature threshold T1. Then, the management controlling device 130 is further configured to determine that the temperature T is higher than the first temperature threshold T1 in step S204 when detecting that the pin 1101 is at the first level.

Similarly, the temperature sensing device 110 is further configured to pull the pin 1102 to the first level (e.g., a logic low level) when detecting that the temperature T of the central processing unit is higher than the second temperature threshold T2. Then, the management controlling device 130 is further configured to determine that the temperature T is higher than the second temperature threshold T2 in step S206 when detecting that the pin 1102 is at the first level. In step S208, the management controlling device 130 then controls the logic device 120 to execute a forced shutdown of the computer system, locks the power button of the computer system, and stores an event log (e.g., a log file). Then, a user may look over the event log of the forced shutdown caused by the temperature T that is higher than the second temperature threshold T2, restore the pin 1101 to an original level and unlock the power button.

In contrast, when the temperature sensing device 110 detects that the temperature T of the central processing unit is lower than the second temperature threshold T2, the temperature sensing device 110 pulls the pin 1102 to a second level (e.g., a logic high level). Then, the management controlling device 130 is configured to determine that the temperature T is lower than the second temperature threshold T2 in step S206 when detecting that the pin 1102 is at the second level.

It should be noted that the second temperature threshold T2 is higher than the first temperature threshold T1.

As a result, the temperature monitoring system 100 can effectively monitor the temperature of the processor (e.g., advanced RISC (Reduced instruction set computing) machine, ARM) processor) in the computer system, and execute a forced shutdown of the computer system to avoid damage to the computer system due to over-temperature when the temperature is higher than the second threshold T2.

Figure 3:
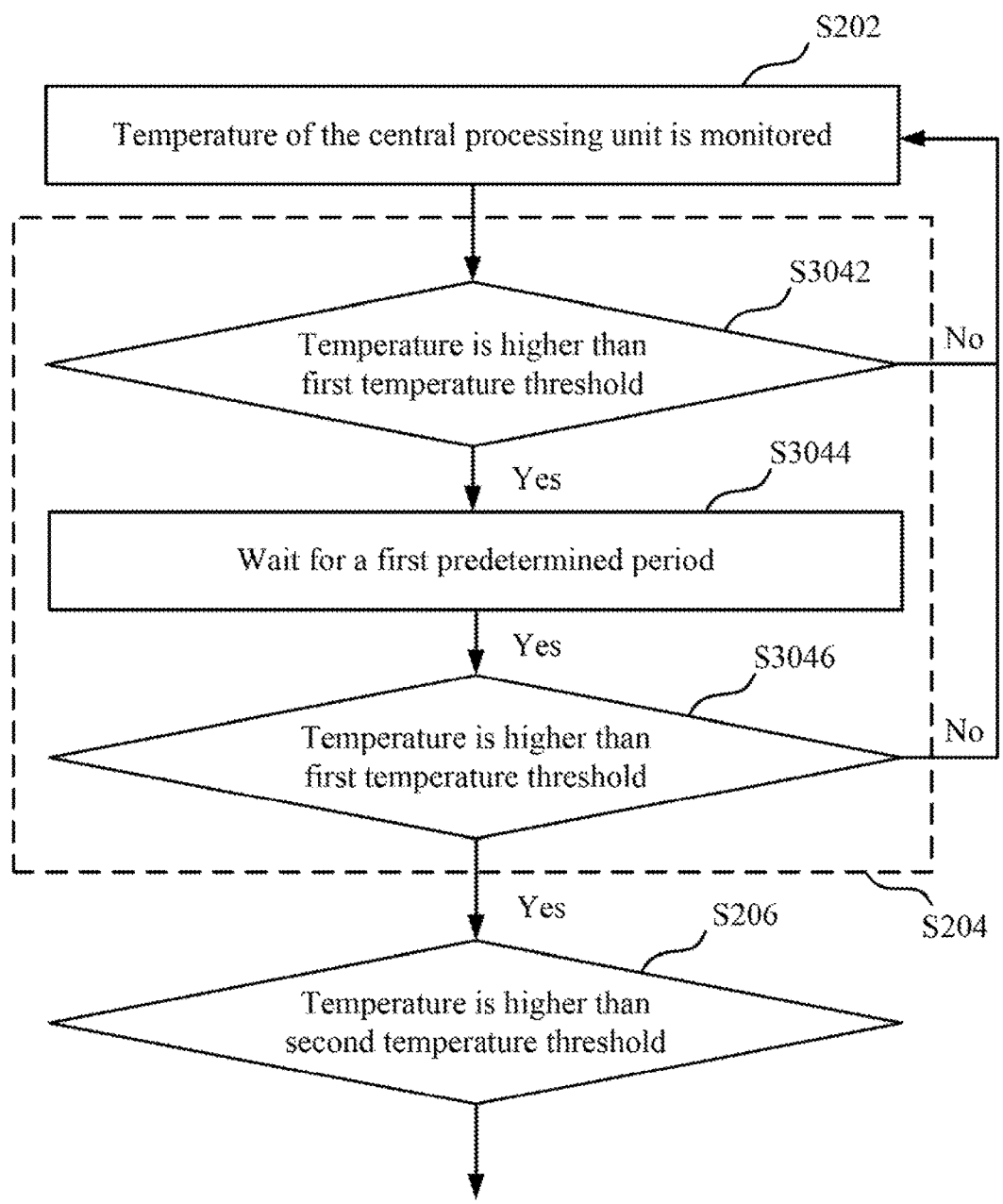
FIG. 3 is a sub-flow chart of the flow chart shown in FIG. 2.

In order to check whether the temperature T of the central processing unit is higher than the first temperature threshold T1, reference is made to FIG. 3. In an embodiment, the step S204 includes steps S3042-3046. As above mentioned, when the temperature T of the temperature sensing device 110 is higher than the first temperature threshold T1, the pin 1101 is pulled to the first level (e.g., logic low level). When the management controlling device 130 detects that the pin 1101 is at the first level, the management controlling device 130 determines that the temperature T is higher than the first temperature threshold T1 in step S3042. in step S3041, the management controlling device 130 waits for a first predetermined period (e.g., about 5 seconds, however, the present disclosure is not limited thereto), and determines whether the temperature T is higher than the first temperature threshold T1 (i.e., whether the pin 1101 is at the first level) again in step S3046. When the management controlling device 130 determines that the temperature T is higher than the first temperature threshold T1 (i.e., the pin 1101 is at the first level) again, it indicates that the temperature T exceeds the safe operating temperature, and therefore the management controlling device 130 further determines whether the temperature is higher than the second temperature threshold T2 again in step S206.

In contrast, in step S3042 or step S3046, when the management controlling device 130 determines that the temperature T is not higher than the first temperature threshold T1 (e.g., the pin 1101 is at the second level (e.g., a logic high level)), it indicates that the temperature T of the central processing unit 140 is still in an adjustable range of a fan of the computer system, and therefore the management controlling device 130 continues monitoring the temperature T of the central processing unit 140 (step S202).

A situation in which the temperature T is between the temperature first threshold T1 and the second temperature threshold T2 is described as follows. When the management controlling device 130 determines that the temperature T is lower than the second temperature threshold T2 in step S206, the management controlling device 130 controls logic device 120 to execute a shutdown process (graceful shutdown) of the computer system and controls a counter to start to count a shutdown time in step S210.

Specifically, when the temperature sensing device detects that the temperature T of the central processing unit 140 is lower than the second temperature threshold T2, the temperature sensing device pulls the pin 1102 to the second level (e.g., logic high level). Then, the management controlling device 130 is further configured to determine that the temperature T is lower than the second temperature threshold T2 in step S206 when detecting that the pin 1102 is at the second level.

When the management controlling device 130 determines that the shutdown process is successful in step S212, the management controlling device 130 locks the power button of the computer system, clears the shutdown time counted by the counter, and stores an event log (e.g., a log file) in step S214.

In contrast, when the management controlling device 130 determines that the shutdown process is failed in step S212, the management controlling device 130 further determines a reason of the failed shutdown process (e.g., the temperature T is higher than the second temperature threshold T2 or the shutdown time is longer than the second predetermined period (e.g. about 3 minutes, however, the present disclosure is not limited thereto)) in step S216. When the temperature T is higher than the second temperature threshold T2 or the shutdown time is longer than the second predetermined period, the management controlling device 130 controls the logic device 120 to execute a forced shutdown of the computer system, locks the power button of the computer system, clears the shutdown time counted by the counter, and stores an event log (e.g., a log file).

As a result, when the computer system shutdown process is failed, the management controlling device 130 can execute a forced shutdown of the computer system, further determine a reason of the failed shutdown process, and store an event log for a user to debug.

It should be noted that the temperature sensing device 110 is adaptable to a computer system with multiple central processing units 140. For example, the temperature sensing device 110 includes two (or more than two) temperature sensing devices 110 to respectively monitor two (or more than two) central processing units 140 in the computer system. The aforementioned temperature sensing devices 110 are coupled to the same management controlling device 130 to determine whether temperatures T are too high and execute a corresponding action.

In practice, the temperature sensing device 110 may be a temperature transducer, the logic device 120 may be a complex programmable logic device (CPLD), and the management controlling device 130 may be a baseboard management controller (BMC). However, the present disclosure is not limited thereto.

In conclusion, the present disclosure can monitor the temperature T of the central processing unit 140, and execute a corresponding action to effectively protect the computer system from damage when the temperature T is higher than the predetermined temperature threshold (e.g., the first temperature threshold T1, the second temperature threshold T2).

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A temperature monitoring system, comprising:
    a temperature sensing device, configured to monitor a temperature of a central processing unit of a computer system, and set a first temperature threshold and a second temperature threshold;
    a management controlling device, coupled to the temperature sensing device and configured to determine whether the temperature is higher than the first temperature threshold, and further determine whether the temperature is higher than the second temperature threshold when the temperature is higher than the first temperature threshold, wherein the second temperature threshold is higher than the first temperature threshold; and
    a logic device, coupled to the management controlling device and configured to control the computer system to turn on or shut down, wherein when the temperature is higher than the second temperature threshold, the management controlling device controls the logic device to execute a forced shutdown of the computer system, locks a power button of the computer system, and stores an event log;
    wherein when the temperature is lower than the first temperature threshold and lower than the second temperature threshold, the management controlling device controls the logic device to execute a shutdown process of the computer system, and controls a counter to start to count a shutdown time;
    when the management controlling device determines that the shutdown process is successful, the management controlling device locks the power button of the computer system, clears the shutdown time of the counter, and stores the event log.

2. The temperature monitoring system of claim 1, wherein when the management controlling device determines the shutdown process is failed, the management controlling device determines whether the temperature is higher than the second temperature threshold, and when the temperature is higher than the second temperature threshold, the management controlling device controls the logic device to execute the forced shutdown of the computer system, locks the power button of the computer system, clears the shutdown time of the counter, and stores the event log.

3. The temperature monitoring system of claim 1, wherein when the management controlling device determines that the shutdown process is failed, the management controlling device determines whether the shutdown time is longer than a second predetermined period, and when the shutdown time is longer than the second predetermined period, the management controlling device controls the logic device to execute the forced shutdown of the computer system, locks the power button of the computer system, clears the shutdown time of the counter, and stores the event log.

4. The temperature monitoring system of claim 1, wherein the temperature sensing device is further configured to pull a first pin of the temperature sensing device to a first level when detecting that the temperature is higher than the first temperature threshold, pull a second pin of the temperature sensing device to the first level when detecting that the temperature is higher than the second temperature threshold, and pull the second pin to a second level when detecting the temperature is lower than the second temperature threshold; and
    the management controlling device is further configured to determine that the temperature is higher than the first temperature threshold when detecting the first pin is at the first level, determine that the temperature is higher than the second temperature threshold when detecting that the second pin is at the first level, and determine that the temperature is lower than the second temperature threshold when detecting that the second pin is at the second level.

5. A temperature monitoring method, comprising:
- by a temperature sensing device, monitoring a temperature of a central processing unit of a computer system, and setting a first temperature threshold and a second temperature threshold;
- by a management controlling device, determining whether the temperature is higher than the first temperature threshold;
- when the temperature is higher than the first temperature threshold, by the management controlling device, further determining whether the temperature is higher than the second temperature threshold, wherein the second temperature threshold is higher than the first temperature threshold;
- when the temperature is higher than the second temperature threshold, by the management controlling device, controlling a logic device to execute a forced shutdown of the computer system, locking a power button of the computer system, and storing an event log;
- by the management controlling device, controlling the logic device to execute a shutdown process of the computer system and controlling a counter to start to count a shutdown time when the temperature is higher than the first temperature threshold and lower than the second temperature threshold; and
- when the management controlling device determines that the shutdown process is successful, by the management controlling device, locking the power button of the computer system, cleaning the shutdown time of the counter, and storing the event log.

6. The temperature monitoring method of claim 5, further comprising:
- when the management controlling device determines that the shutdown process is failed, by the management controlling device, determining whether the temperature is higher than the second temperature threshold; and
- when the temperature is higher than the second temperature threshold, by the management controlling device, controlling the logic device to execute the forced shutdown of the computer system, locking the power button of the computer system, clearing the shutdown time of the counter, and storing the event log.

7. The temperature monitoring method of claim 5, further comprising:
- when the management controlling device determines that the shutdown process is failed, by the management controlling device, determining whether the shutdown time is longer than a second predetermined period; and
- when the shutdown time is longer than the second predetermined period, by the management controlling device, controlling the logic device to execute the forced shutdown of the computer system, locking the power button of the computer system, clearing the shutdown time of the counter, and storing the event log.

8. The temperature monitoring method of claim 5, further comprising:
- by the temperature sensing device, pulling a first pin of the temperature sensing device to a first level when detecting that the temperature is higher than the first temperature threshold, pulling a second pin of the temperature sensing device to the first level when detecting that the temperature is higher than the second temperature threshold, and pulling the second pin to a second level when detecting that the temperature is lower than the second temperature threshold; and
- by the management controlling device, determining that the temperature is higher than the first temperature threshold when detecting that the first pin is at the first level, determining that the temperature is higher than the second temperature threshold when detecting that the second pin is at the first level, and determining that the temperature is lower than the second temperature threshold when detecting that the second pin is at the second level.

* * * * *